United States Patent [19]

Sorensen et al.

[11] 3,955,344

[45] May 11, 1976

[54] PITMAN MOWER

[75] Inventors: Robert Sorensen, Glen Ellyn; Richard A. Zablocki, Downers Grove; Paul C. Gordon, Hinsdale, all of Ill.

[73] Assignee: International Harvester Company, Chicago, Ill.

[22] Filed: Apr. 10, 1975

[21] Appl. No.: 566,878

[52] U.S. Cl. .................................. 56/10.4; 56/12.6; 56/15.2; 56/15.8; 56/264
[51] Int. Cl.² .......................................... A01D 35/08
[58] Field of Search .................. 56/10.4, 12.6, 15.2, 56/15.5, 15.7, 15.8, 15.9, 16.2, 264, DIG. 9

[56] References Cited
UNITED STATES PATENTS

| | | | |
|---|---|---|---|
| 2,495,986 | 1/1950 | Schroeppel | 56/15.7 |
| 3,791,115 | 2/1974 | Nelsen et al. | 56/10.4 X |

Primary Examiner—Hugh R. Chamblee
Assistant Examiner—J. N. Eskovitz
Attorney, Agent, or Firm—Dennis K. Sullivan; Floyd B. Harman

[57] ABSTRACT

A pitman mower has a hitch frame, a drag bar, a cutterbar pivotally attached to the drag bar for pivotal movement in the transverse vertical plane and a drive mechanism for the cutterbar mounted on the drag bar. A pair of fore-and-aft extending links interconnect the hitch frame and drag bar in a generally horizontal four bar parallel linkage, the left link being resilient in the transverse direction, preferably comprising a leaf spring, having one end rigidly connected to its adjacent member. The right link comprises a breakaway pull bar assembly rotatable about an axis generally longitudinal thereof and has a float spring and lifting chain connected thereto and disposed to rotate the pull bar against the load imposed thereon by a gag link connected to the pull bar away from the axis of rotation thereof and extending to the cutterbar to control its rotation about the drag bar.

8 Claims, 6 Drawing Figures

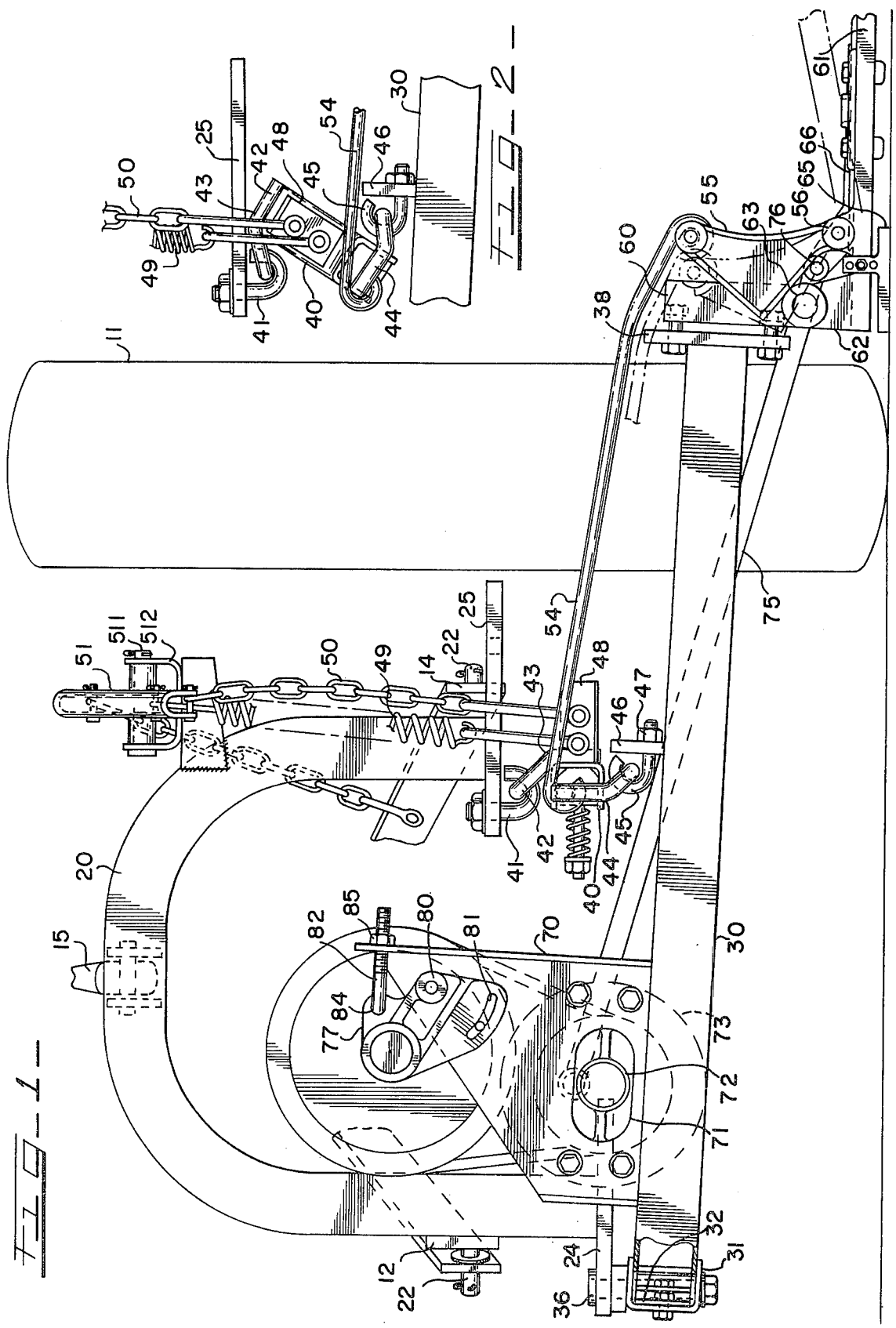

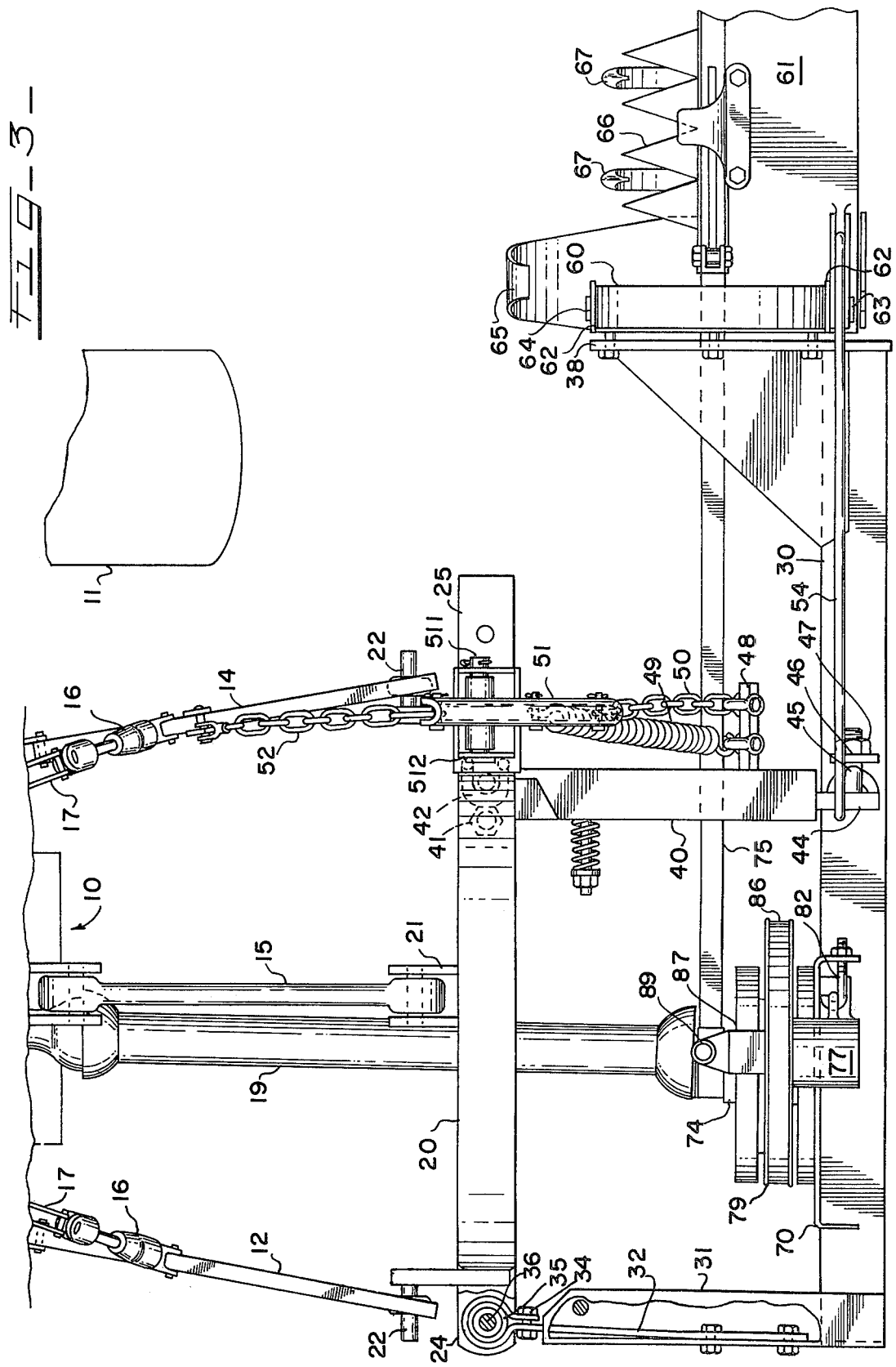

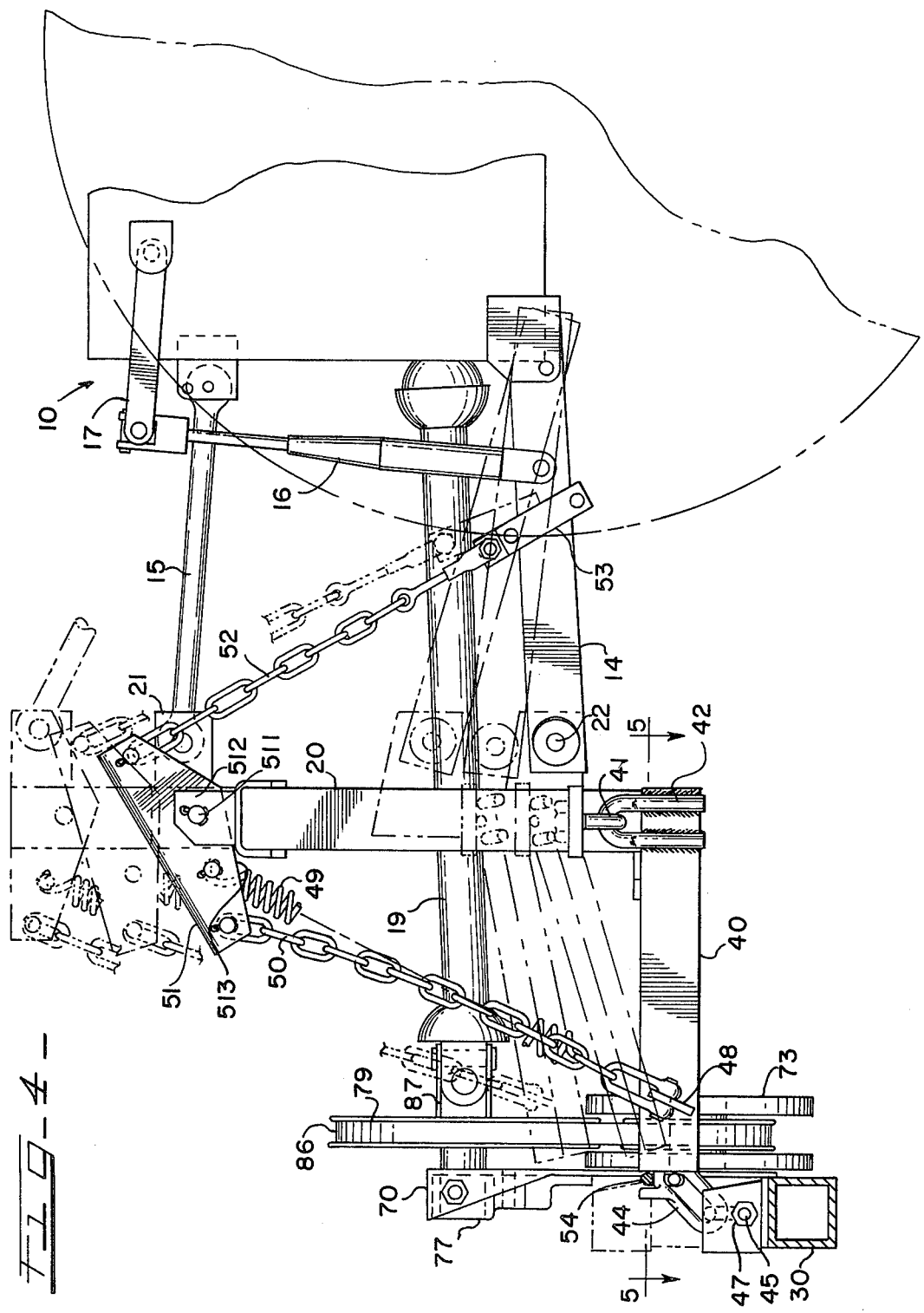

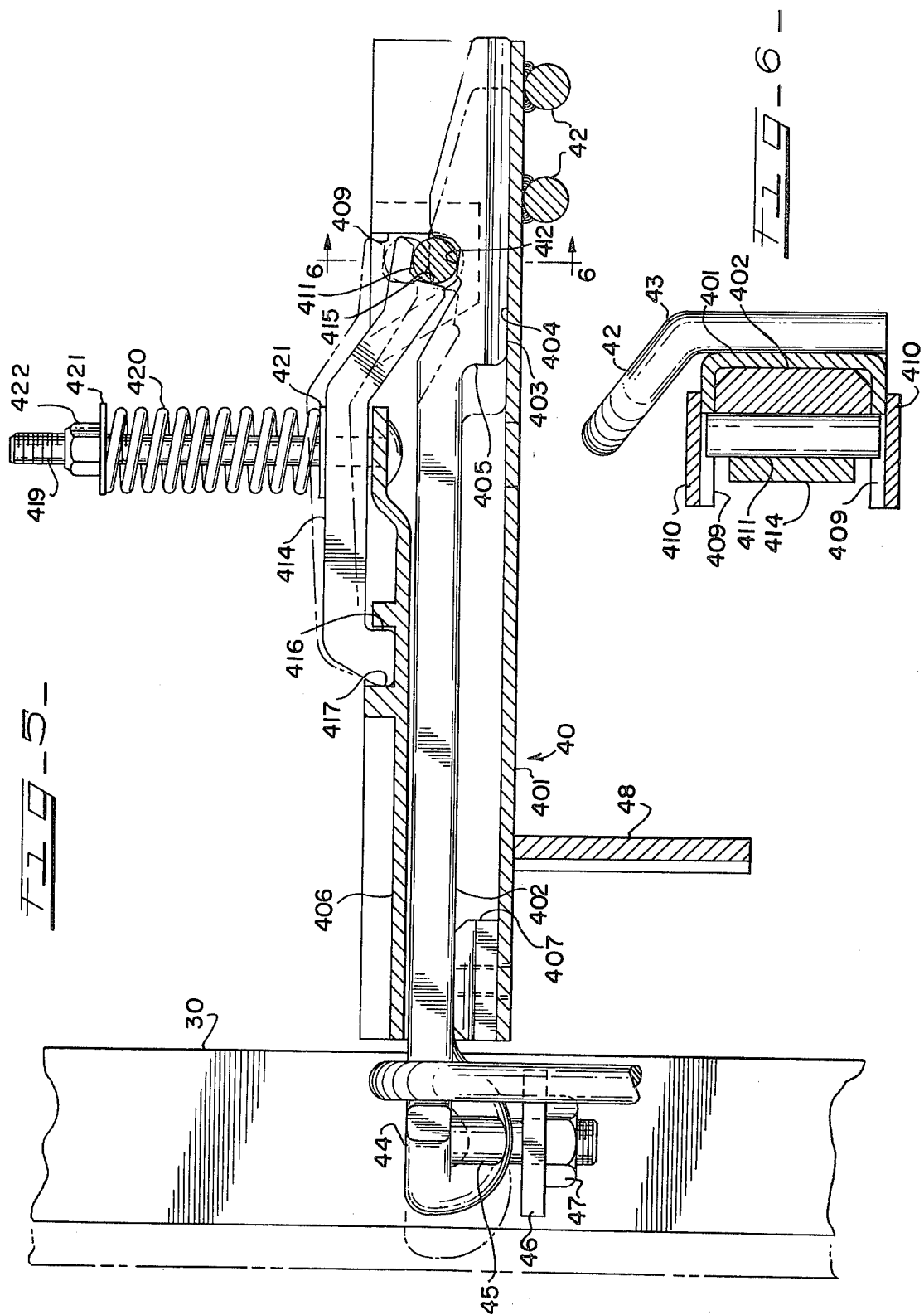

PITMAN MOWER

CROSS REFERENCE TO RELATED APPLICATIONS

This application is related to application Ser. No. 566,877, filed Apr. 10, 1975, by Robert Sorensen and Richard A. Zablocki entitled "Cutterbar Control System" and to application Ser. No. 566,879, filed Apr. 10, 1975, by Robert Sorensen and Paul C. Gordon entitled "Sickle Bar Mower Mounting Apparatus", both of the above applications being assigned to assignee hereof.

BACKGROUND OF THE INVENTION AND THE PRIOR ART

This invention relates to sickle bar mowers of the agricultural or highway type and, more particularly, to a pitman mower having novel cutterbar control and mounting arrangements which coact to produce an inexpensive lightweight mower of relatively uncomplicated design without the sacrifice of the functional aspects necessary in a commercially acceptable mower, such as vibration isolation, cutterbar floatation and lift, breakback capability of the cutterbar in response to obstructions in the field, and durability.

Commercially mowers in use today comprise two general types, the balanced head or wobble drive mower and the pitman mower. Both types have their advantages and their deficiencies. The major deficiency of the wobble drive type is cost, the major difference being in the drive itself. On the other hand, this type of mower is relatively free from vibration. Simple pitman mowers are relatively inexpensive but suffer the vice of transmitting sickle vibration back to the tractor causing operator fatigue and premature failure of parts. Counterbalancing the sickle forces becomes complicated and expensive. Both systems provide linkages for raising the cutterbar to a gag position and for lifting the entire unit off the ground preferably including a floatation spring to reduce the pressure of the mower against the ground. Breakaway of the cutterbar in response to obstructions, such as tree stumps, is provided either by the cutterbar itself pivoting back about the drag bar which does not lend itself to pitman mowers or by having both the drag bar and the cutterbar pivot back as the unit, sometimes also including part of the frame.

In the referenced copending application, Ser. No. 566,879, there is claimed a unique vibration-inhibiting mower mounting system wherein the hitch frame of the mower and the drag bar are connected in a generally horizontal four bar linkage by a pair of fore-and-aft links wherein in one of the links is transversely resilient, preferably a leaf spring, having one end rigidly connected to the drag bar to maintain the lateral position of the mower. Of the prior art pertaining to this feature, the Schroeppel U.S. Pat. No. 2,495,986 and the Scarnato et al. U.S. Pat. No. 3,092,947 and U.S. Pat. No. 3,302,376 appear to be the most pertinent. A discussion of these references and other less pertinent references may be found by reference to the copending application.

In the referenced copending application, Ser. No. 566,877, a unique pull bar assembly is claimed which fulfills the combined functions of draft link, part of the lifting linkage, and breakaway link. More specifically, the pull bar assembly comprises a fore-and-aft link interconnecting the hitch frame of the mower with the drag bar which is rotatable about an axis generally longitudinal thereof, a floatation spring and lifting chain being connected to the pull bar assembly and disposed to rotate it against the load imposed thereon by a gag link connected thereto at a point away from the axis of rotation and extending to the cutterbar to control its rotation. The pull bar assembly is also longitudinally extendable in response to overload conditions on the cutterbar. Prior art references pertinent to this feature include the Hurlburt et al. U.S. Pat. No. 3,407,578 and U.S. Pat. No. 3,418,796 and the Burton U.S. Pat. No. 2,699,635 which are discussed in the copending application.

It is our belief that while either of the inventions claimed in the copending applications might be used advantageously independently of the other, their advantages are best utilized when combined in a single mower structure to produce an economical, relatively uncomplicated and durable pitman mower.

Moreover, the resulting mower possesses several advantages which would not be realized except when the inventions are combined as taught herein. For example, when the pull bar assembly is used, a certain amount of pivoting in a horizontal fore-and-aft plane occurs between the left end of drag bar and the hitch frame during the gagging operation. In the prior art design of the left end, a horizontal pivot mounting is provided at this point. However, by utilizing the leaf spring in combination with the pull bar assembly, this horizontal pivot mounting is unnecessary and can be eliminated since the leaf spring may be torsionally deflected enough to satisfy the movement of the drag bar relative to the hitch frame.

A further advantage of the combination is that the vibration-inhibiting action of the leaf spring is not dampened by external transverse forces imposed on the drag bar by the floatation and lifting members when the above-mentioned pull bar is used in conjunction therewith since both the floatation spring and lifting chain are vertically oriented especially in the operating position of the mower. Conventional lift linkages are generally not vertically oriented, although the spring in the Hurlburt U.S. Pat. No. 3,418,796 is, and thus exert transverse loads on the drag bar which would prestress the leaf spring and dampen its vibration-inhibiting properties.

A still further advantage of utilizing the above-mentioned pull bar in combination with the leaf spring is that in utilizing the four bar parallel linkage including a resilient link, rigidly mounted to the drag bar to inhibit vibration transfer from the sickle to the tractor, the fewer connections there are between the drag bar and the hitch frame while maintaining the necessary functions of the mower, the better. Since the pull bar combines the functions of draft link, lift linkage connection between the frame and drag bar, and breakaway link, only two connections to the vibrating part of the mower are necessary. In the prior art, where these three functions are not combined, additional connections are necessary.

SUMMARY OF THE INVENTION

Accordingly, it is an object of the invention disclosed herein to provide a hitch controlled pitman mower having a mounting system for connecting the drag bar to the tractor adapted to inhibit the transfer of vibration from the mower to the tractor wherein one of the draft links used in the mounting system further provides a portion of the means for lifting the cutterbar without interferring with the vibration inhibition.

It is further an object of the invention to provide said mower with a draft link which is extendible in response to overload conditions on the cutterbar to enable the entire drag bar assembly to pivot backward when obstructions are encountered.

In accordance with the invention, the mower is provided with a hitch frame for attachment to a vertically movable tractor hitch, the mower drag bar being mounted to the drag bar by a pair of links to form a generally horizontal four bar parallel linkage, the hitch frame being the stationary member. The left link, which preferably comprises a leaf spring, is resilient in the transverse direction and rigidly mounted to an adjacent link, preferably being pivotally mounted to the hitch frame and rigidly mounted to the drag bar. The right link comprises a pull bar, preferably extendible in response to overload forces on the cutterbar, which interconnects the opposite side of the hitch frame with the intermediate portion of the drag bar, the pull bar being mounted for rotation about an axis generally longitudinal thereof, the mounting of the pull bar to the hitch frame preferably being universal to permit lateral and vertical swinging movements of the pull bar, the mounting of the pull bar to the drag bar being similar. The cutterbar gag link, which pivots the cutterbar vertically about the end of the drag bar, is connected to the pull bar remote from the rotational axis thereof. The float spring and lifting chain are also connected respectively to the pull bar and are disposed to rotate the pull bar against the load imposed by the gag link.

BRIEF DESCRIPTION OF THE DRAWINGS

Thus, in accordance with our invention, a mower is provided having a vibration inhibiting mounting system which includes a simple arrangement for controlling the positioning of the pull bar is provided which results in a lightweight economical structure, as will be apparent to those skilled in the art upon examination of the drawings, in which:

FIG. 1 is a rear view of a portion of a tractor and a mower incorporating the novel aspects of our invention, the mower being illustrated in the operating position;

FIG. 2 is a partial rear view of the mower of FIG. 1 illustrating the pull bar in the gag position;

FIG. 3 is a top view of the tractor and mower of FIG. 1 in the operating position;

FIG. 4 is a side view, partly in section, of the tractor and mower of FIG. 1 illustrating the mower in the operating position, the gag and lift position being illustrated in phantom;

FIG. 5 is a transverse longitudinal sectional view of the pull bar assembly taken along the line 5—5 of FIG. 4; and FIG. 6 is a sectional view of the pull bar assembly taken along the line 6—6 of FIG. 5.

DESCRIPTION OF THE PREFERRED EMBODIMENT

In accordance with the conventions of the industry, directional terms, such as "left", "right", "fore", and "aft", are to be considered as viewed by one standing behind the tractor and implement and facing them.

Turning to the drawings, there is shown the rear portion of a conventional agricultural tractor generally designated 10, including a right ground wheel 11, which is provided with a vertically movable, three point, free link hitch linkage in accordance with the art including a pair of left and right lower hitch links 12 and 14 respectively and an upper center link 15 pivotally mounted at their forward ends to the tractor 10 for vertical swinging movement. A pair of lift links 16 are pivotally mounted respectively to the lower hitch links 12 and 14 intermediate their ends and extend upwardly to pivotal connections to the powered tractor lift arms 17 which rotate in a vertical plane to raise and lower the hitch links. The tractor is provided with a standard power take-off means to which may be connected an extendible PTO shaft 19 for driving associated implements such as our mower.

The mower comprises an inverted U-shaped hitch frame or bail 20 of rectangular cross section having a generally upright transverse orientation. Integrally mounted to the forward side of the top center portion of the bail 20 is a clevis 21 to which is pinned the rearward end of the upper hitch link 15. Each of the legs of the bail 20 are provided respectively with an outwardly extending pin 22 which receives one of the lower hitch links 12 and 14, the pins 22 being arranged along a common axis. The hitch links thus maintain the bail 20 in an upright position while enabling it to be moved vertically. The left leg of the bail 20 extends downwardly from the pin 22 to a horizontal mounting plate 24 and the right leg extends downwardly to a horizontal mounting plate 25, which is at a higher level to accommodate the geometry of the lifting linkage as may be seen in FIG. 1.

The mower further comprises coupling means including a drag bar 30 and cutterbar 61 which, in the normal operating position, extend transversely, or parallel to the bail 20, in a generally horizontal plane. The left end of the drag bar 30 is provided with a U-shaped channel member 31 welded thereto and having an open right side, the member 31 extending forwardly towards the bail 20 but not touching it. A fore-and-aft extending steel leaf spring 32 is attached at its rearward end to the channel member 31 as by bolts and is bent away therefrom to permit relative movement therebetween. The channel member 31 is also provided with a vertical bumper member 33 which may be a bolt spaced to the right side of the spring 32, the bumper 33 and the right side of the channel member 31 preventing excessive deflection of the spring 32 but not normally touching it.

The forward end of the leaf spring 32 is wrapped around and tightly clamped as by bolt assembly 34, to a bushing 35 which is mounted for free rotation on a vertical pin 36 depending downwardly from the left mounting plate 24, a nut and washer retaining the bushing 35 on the pin 36. The leaf spring 32 has its major cross sectional dimension in the vertical direction, thereby providing its major resiliency in the transverse direction. To permit a small amount of pivoting of the drag bar 30 relative to the bail 20 during the lifting operation, the leaf spring also is capable of torsional deflection on the order of about 5° either way. Thus, the leaf spring 32 provides a link between the drag bar 30 and the bail 20, the link being pivotally mounted at its forward end to the hitch frame 20 and rigidly mounted to the drag bar 30 and being resilient in the transverse direction.

A generally fore-and-aft extending pull bar assembly 40, interconnects the right leg of the bail 20 with the intermediate portion of the drag bar 30, thereby forming a draft link. The connection between the forward end of the pull bar assembly 40 and the bail 20 is accomplished with a threaded hook 41 depending downwardly from the right horizontal plate 24, a nut drawing the free end of the hook 41 up into close proximity to the plate 24 transverse of the threaded shank thereof. The hook engages a U-shaped eye member 42 welded to the side of the forward portion of the pull bar assembly 40 and extending diagonally above the center thereof in the operating position, thereby forming a knee 43 at the corner of the pull bar assembly, the axis of the U-shaped eye being in the transverse plane. As thus constructed, the hook 41 permits universal pivoting movement of the pull bar assembly 40 about a pivot connection radially offset therefrom. The rearward end of the pull bar assembly 40 is provided with an oval shaped eye member 44 having a transverse opening which extends radially downwardly and rightwardly from the pull bar assembly 40 to produce an offset pivot connection with a threaded hook 45 which is mounted to and drawn upagainst, as by nut 47, an upstanding plate 46 affixed to the drag bar 30, the opening of the hook 45 being fore-and-aft. As thus constructed, the hook 45 permits universal pivoting movement of the pull bar assembly 40 thereabout.

Thus, the leaf spring 32 and pull bar assembly 40 comprise a pair of links which interconnect the drag bar 30 and the hitch frame 20 to form a generally horizontal four bar parallel linkage, the hitch frame 20 being the stationary link. It can be seen from the above description that three of the four joints of the four bar linkage provide for pivotal movement in the horizontal plane while the fourth, the joint between the leaf spring 32 and drag bar 30, is rigid and that the link adjacent the rigid joint, that is the leaf spring 32, is resilient in the transverse direction. The rigid joint combined with the self-centering nature of the leaf spring 32 maintains the mower in its lateral position relative to the tractor.

Examining the pull bar assembly 40 in greater detail, as best seen in FIGS. 5 and 6, it can be seen that it comprises an outer tube 401 of U-shaped channel section, the eye member 42 being welded at the forward end thereof to the web portion of the U. A breakaway bar 402 having the oval eye member 44 as an integral part thereof slidably fits within the outer tube 401 for longitudinal movement therein, the breakaway bar 401 being of generally rectangular section of a size wherein its major dimension is slightly smaller than the distance between the legs of the channelled outer tube 401 to prevent rotation between the tube and the breakaway bar. The forward end of the breakaway bar 402 has a thicker section including a surface 403 which slides against the inner side 404 of the web portion of the channeled tube 401. Rearwardly of the surface 403, the breakaway bar 401 steps down to a smaller width forming a ledge 405, the width of the breakaway bar then being constant to its rear end. The outer tube 401 is provided with a guide plate 406 enclosing the fourth side for a distance at the rear end thereof. A stop block 407 is mounted to the web of the tube 401 opposite the guide plate 406 to prevent the breakaway bar from being pulled completely out of the outer tube 401 by the contact of the ledge 405 and the block 407.

Near its forward end, both legs of the channeled outer tube 401 are provided with a V-shaped cutout 409, a plate 410 being welded to the outer tube 401 to cover each of the cutouts 409. A detent pin 411 extends between the plates 410 and is of a length greater than the distance between the legs of the outer tube so that it may be guided in the cutouts 409. The forward end of the breakaway bar 402 is tapered to be small enough to clear the pin 411 at the bottom of the cutouts 409. Behind the tapered portion of the breakaway bar 401 and in register with the cutouts 409, a detent pocket 412 having a depth somewhat greater than the radius of the pin 411 is provided to receive the pin. A detent lever 414 is provided with a similar detent pocket 415 which fits on the other side of the pin 411 from the pocket 412. It can be seen from FIG. 5, that the detent pockets 412 and 415 form portions of the sides of a square, the square being rotated about 10° clockwise from parallel with the edges of the outer tube 401. This rotation or angling of the detent pockets permits the pin 411 to roll out of the pocket 412 when the breakaway bar 402 is pulled rearwardly.

The detent lever 414 diagonals outwardly to the outside of the guide plate 406 and extends rearwardly to an end having an inturned lug 416 which fits within a pocket 417 formed on the outer side of the guide plate 406. Intermediate its ends, the detent lever 414 is provided with a hole through which a spring support pin 419 extends from the guide plate 406 to a threaded end. A compression spring 420 having retaining washers 421 at either end is mounted about the support pin 419, an adjusting nut 422 being screwed down on the pin to compress the spring 420, thereby setting the preload against the detent pin 411.

Thus, as shown in phantom in FIG. 5, when a sufficient force is applied to the end 44 of the breakaway bar 402, the pin 411 is forced upwardly by the angled detent pocket 412 in the breakaway bar against the detent lever 414 which is loaded by the spring 420 and rolls out of the detent pocket 412. The pull bar assembly 40 may then extend until the ledge 405 on the breakaway bar 402 contacts the stop block 407 on the outer tube 401.

The drag bar 30 extends rightwardly from the pull bar assembly 40 to a vertical cutterbar mounting plate 38 outboard of the tractor wheel 11. A hinge member 60 is bolted to the mounting plate 38 and extends downwardly to a bifurcated end whereat a transversely extending mower cutterbar 61 having hinge ears 62 is pivotally mounted thereto by pins 63 and 64 having a common fore and aft axis to provide for vertical swinging of the cutterbar 61 thereabout. The cutterbar 61 is of conventional design and is provided with an inner gaging shoe 65 and an outer gaging shoe (not shown). Mounted on the forward side of the cutterbar are the conventional transversely reciprocating sickle 66 and mower guards 67.

As may be seen in FIGS. 1 and 2, the pull bar assembly 40 may rotate about an axis generally longitudinal thereof but slightly skewed therefrom which extends between the hooks 41 and 45. This action enables the pull bar assembly 40 to become part of the lifting linkage for the mower. To this end, the pull bar assembly 40 is provided with radial lever arm 48 welded to the outer tube near the rear end thereof. A float spring 49 and a lift chain 50 are connected to the lever arm 48 by pin and clevis assemblies, the spring being closer to the axis of the pull bar 40 than the lift chain. As may best be seen in FIG. 4, the opposite ends of the float spring 49 and lift chain 50 are connected to the rear end of a rocker lever 51 pivotally mounted on a transverse pin 511 mounted in a bracket 512 welded to the upper portion of the bail 20 vertically above the pull bar assembly 40, the lift chain 50 being connected to the rocker lever 51 further from the fulcrum pin 511 than the float spring 49 to provide it with additional mechanical advantage. The lower edge 513 of the lever 51 is positioned to contact with the bottom of the bracket 512 to provide a stop against the downward travel of the lever 51 caused by the float spring 49 and lift chain 50. The forward end of the lever 51 is connected by a chain 52 to the intermediate portion as at 53 of the lower hitch link 14, the chain 52 being just taut at the position of the hitch links where gagging is to begin. The chain 52 could be optionally attached to a fixed point on the tractor, such as the draw bar hitch, if a greater amount of lifting is desired.

A gag link 54 comprising an elongated rod with hooked ends is pivotally connected to the upper portion of the oval eye member 44 away from the hook 45, that is, away from the axis of rotation of the pull bar assembly 40, and extends transversely whereat it is pivotally connected to the upper end of a lift lever 55 pivotally mounted to the cutterbar 61 as at 56, a medial portion of the lift lever resting on the hinge ear 62 of the cutterbar 61 to provide a fulcrum point therefor. Thus, as shown in phantom in FIG. 1, a leftward pull on the gag link 54 will cause the cutterbar 61 to pivot about the pin 63 raising the outer end of the cutterbar.

The mower drive means comprises an upstanding transverse plate 70 mounted on the drag bar 30 between the leaf spring 32 and the pull bar assembly 40. A bearing housing 71 is bolted to the lower part of the forward side of the plate 70 and extends therethrough. A shaft 72 is journalled in the housing 61 and extends forwardly whereat a flywheel 73 having a sheave is mounted thereon. The forward side of the flywheel 73 is provided with means 74 such as a pin and bearing housing for pivotally attaching a pitman stick 75 thereto, the flywheel being counterweighted against the weight of the mounting means 74 and about half of the weight of the pitman stick 75 in accordance with the art. The pitman stick 75 extends transversely downwardly to a pivotal connection with the sickle 66 as at 76. A journal arm 77, on which is journalled an input drive sheave 79, is pivotally mounted to the upper portion of the plate 70 about pin 80. The journal arm 77 is provided with an arcuate slot 81 concentric about the pin 80 through which a bolt may be inserted into the plate 70 to maintain the journal arm 77 in position. A J-bolt 82 hooks into the journal arm as at 84 and extends through an outturned edge of the plate 70 whereat it is provided with a nut 85 which may be used to tension a belt 86 extending around the drive sheave 79 and the sheave on the flywheel 73. A stub shaft 87 extends forwardly from the drive sheave to a universal joint assembly 89 providing a power connection with the PTO shaft 19.

THE OPERATION OF THE PREFERRED EMBODIMENT

In the normal operating position, as shown in solid lines in FIGS. 1, 3, and 4, the lower surface 513 of the rocker lever 51 is in contact with the mounting bracket 512 (FIG. 4). In this position, the lift chain 50 is slack to allow the mower to follow ground variations. The rocker arm actuating chain 52 is also untensioned. The float spring 49 is under tension and acts in a generally vertical plane on the lever arm 48 to cause a torque on the pull bar assembly in a counterclockwise direction, as viewed in FIG. 1, thereby counterbalancing a portion of the weight of the outer end of the cutterbar 61 which acts through the gag link 54 to cause a torque on the pull bar assembly 40 in the clockwise direction. The float spring also counterbalances a portion of the weight of the inner end of the cutterbar by the vertical lifting force exerted on the drag bar through the hook connection at the rear end of the pull bar. Thus, the weight of the drag bar, the drive means, and the cutterbar will be counterbalanced to ride more lightly over the ground, thereby reducing ground friction 65 as is desirable in mowing applications.

When the three point hitch linkage of the tractor is raised to move the mower to the gagged position, the distance between the intermediate point 53 on the lower hitch link 14 and the top of the bail 20 increases. This causes the chain 52 to be put into tension and pulls the forward end of the rocker lever 51 down in turn tensioning the chain 50 and causing the lever arm 48 and the pull bar assembly 40 to be rotated counterclockwise about the axis between the hooks 41 and 45 as viewed from the rear. Since the lift chain 50 is connected to the rocker lever 51 further away from the pin 511 than the float spring 49, the tension on the spring becomes lessened. Continued raising of the hitch rotates the pull bar assembly until the knee 43 of the U-shaped member 42 rotates up to contact the bottom side of the horizontal plate 25. This rotation also causes the oval eye member 44 to rotate clockwise about the hook 45 exerting a leftward pull on the gag link 54 which raises the outer shoe of the cutterbar off the ground. In FIG. 2, the pull bar is shown in the gagged position and it will be noted that, due to the radial offset of the eyes 42 and 44, the pull bar 40 has skewed from the axis of rotation. In viewing FIG. 4, it can be seen that the pull bar also rotates relative to the hooks 41 and 45 in the vertical fore-and-aft plane to allow the inner shoe 65 of the cutterbar to remain on the ground. When the knee 43 of the U-shaped eye 42 contacts the horizontal plate 25 on the bail 20, further rotation of the pull bar assembly is stopped with the mower in the gagged position. At this point, continued lifting of the three point hitch links will raise the inner shoe 65 off the ground and the entire cutterbar 61 and drag bar 30 to the uppermost phantom position shown in FIG. 4 for transport purposes. Since the rear end of the lever 51 continues to move upwardly relative to the bail 20, the lifting chain 50 pulls the pull bar assembly 40 into a more nearly horizontal position.

It is noted that when the hitch bail 20 is raised to rotate the pull bar assembly 40 to the gagged position, the left side of the hitch bail 20 raises the left end of the drag bar 30 to a greater angle relative to the ground, the inner shoe 65 remaining thereon. This is compensated in the left end of the drag bar by permitting torsional deflection of the spring 32 of about 5°. As indicated above, further lifting beyond the gagged position will cause the drag bar to be more nearly horizontal.

Should the mower encounter a fixed obstruction, such as a tree stump during operation, sufficient load, in excess of about 400 pounds at the outer end of a 7 foot cutterbar, will be generated to overcome the detent spring 420 in the pull bar assembly 40 and enable the pull bar 40 to extend thus causing the entire drag bar assembly 30 to pivot backwards about the pivot point 36. The extension of the pull bar 40 assembly takes place between the connection of the gag link 54 thereto and the lever arm 48 preventing adverse loading of the float spring 49 and lift chain 50.

In the operation of the cutterbar, the reciprocation of the sickle 66 will cause oscillating loads to be transmitted through the pitman stick 75 and flywheel 73 to the drag bar 30 and also by friction through the cutterbar 61 to the drag bar 30. The drag bar and cutterbar will thus oscillate transversely, generally giving a total oscillating motion of about one-fourth inch. This oscillation of the cutterbar is beneficial to the cutting efficiency and the cleaning of the cutterbar. The transverse oscillations or deflections of the drag bar 30 cause the rearward end of the leaf spring 32 to deflect. However, since the forward end of the leaf spring is pivotally mounted to the bail or hitch frame 20, very little of the vibration of the drag bar and rearward end of the leaf spring is transmitted to the frame and hitch links. The vibration that is transmitted is believed to be due to the deflection of the leaf spring imposing a side load on the pin 36. A softer spring constant would reduce this even further. Similarly, because the pull bar assembly is capable of pivotal movement in the horizontal plane relative to both the bail and the drag bar, almost no vibration is transferred through that link to the bail 20. Moreover, since there are no other connections to the drag bar but the pull bar 40, the leaf spring cannot be damped or vibration transmitted to the frame by external means.

Thus, there has been provided in accordance with the invention a sickle bar mower that fully satisfies the objects, aims, and advantages set forth above. While the invention has been described in connection with a specific embodiment thereof, it is evident that many alternatives modifications and variations will be apparent to those skilled in the art in light of the foregoing description. Accordingly, it is intended to embrace all such alternatives modifications and variations as fall within the spirit and broad scope of the appended claims.

What is claimed is:

1. A pitman mower adapted for attachment to a tractor having a vertically movable implement hitch comprising:
   a hitch frame adapted for attachment to said tractor hitch;
   a transversely extending drag bar;
   a transversely extending cutterbar pivotally mounted to said drag bar for vertical swinging movement, said cutterbar including a sickle;
   drive means for said sickle mounted on said drag bar;
   a generally fore-and-aft extending link having a forward end pivotally mounted to said hitch frame for rotation about a vertical axis and a rearward end mounted to said drag bar by means preventing pivotal movement therebetween in the horizontal plane, said link being resilient in the transverse direction;
   a generally fore-and-aft extending pull bar having a forward end mounted for pivotal movement to said hitch frame and a rearward end mounted for pivotal movement to said drag bar, said pull bar being rotatable about an axis generally longitudinal thereof;
   gag link means interconnecting said cutterbar and said pull bar and disposed to exert a torque thereon due to the weight of said cutterbar;
   a floatation spring interconnecting said hitch frame and said pull bar and disposed to exert a torque thereon in opposition to said torque exerted by said gag link means; and
   lifting member interconnecting said pull bar and said hitch frame and disposed to rotate said pull bar against said torque exerted by said gag link means upon said hitch frame being raised.

2. The invention in accordance with claim 1 wherein said link comprises a leaf spring rigidly connected to said drag bar.

3. The invention in accordance with claim 2 and said leaf spring being torsionally resilient.

4. The invention in accordance with claim 3 and a portion of said pull bar being longitudinally extendible upon the imposition of a predetermined draft load on said pull bar, said drag bar and said cutterbar pivoting rearwardly about said vertical pivot axis between said link and said hitch frame, said floatation spring and said lifting means being connected to the nonextendable portion of said pull bar.

5. The invention in accordance with claim 1 and said hitch frame comprising a rocker lever having a medial portion pivotally mounted to said frame generally vertical of said pull bar, said float spring and said lifting member being connected to one end of said lever, a tensile member connected to the other end of said lever and adapted for connection to said tractor hitch.

6. In combination with a tractor having a vertically movable implement hitch, a pitman mower comprising a transverse upstanding hitch frame attached to said tractor hitch, a drag bar parallel to said hitch frame, a transverse cutterbar including a sickle pivotally mounted to one end of said drag bar for vertical movement thereabout, pitman drive means for said sickle mounted on said drag bar and adapted to be driven by said tractor, a leaf spring resilient in the transverse direction pivotally mounted to said hitch frame for rotation about a vertical axis and rigidly mounted to said drag bar, a pull bar mounted for universal pivotal movement to said hitch frame and to said drag bar, said pull bar being rotatable about an axis generally longitudinal thereof, said pull bar comprising an outer tube connected to said hitch frame, a breakaway bar telescopingly nonrotatably engaged with said outer tube and connected to said drag bar and detent means preventing movement therebetween in the absence of a predetermined load, a gag link interconnecting said breakaway bar with said cutterbar, the weight of said cutterbar acting through said gag link to exert a torque on said pull bar, floatation spring means connected to said outer tube of said pull bar and disposed to exert a torque on said pull bar in opposition to said torque exerted by said cutterbar, and lifting means connected to said outer tube of said pull bar and disposed to rotate said pull bar against said torque exerted thereon by said cutterbar upon said tractor hitch being raised.

7. The invention in accordance with claim 6 and said leaf spring being torsionally resilient.

8. The invention in accordance with claim 7 and a rocker lever medially pivotally mounted to said hitch frame above said pull bar, said floatation spring means and said lifting means being connected to one end thereof, and a tensile member connected to said lever at the other end thereof and attached to said tractor hitch.

* * * * *